Jan. 3, 1933.                A. A. WARNER                1,892,793
                             VIBRATION DAMPER
                           Filed April 15, 1931

INVENTOR
Archibald A. Warner.
BY
Harness, Dickey, Pierce & Hann,
ATTORNEYS.

Patented Jan. 3, 1933

1,892,793

UNITED STATES PATENT OFFICE

ARCHIBALD A. WARNER, OF DEARBORN, MICHIGAN

VIBRATION DAMPER

Application filed April 15, 1931. Serial No. 530,392.

The invention relates to vibration dampers for motor vehicles and has particular relation to a device of this character adapted to be used in conjunction with a transmission shaft.

One object of the invention is to provide a vibration damper for eliminating vibrations occurring in a transmission shaft during rotation thereof by the motor.

Another object of the invention is to provide a vibration damper for eliminating vibrations in the transmission shaft which is adapted to be located particularly in the region of the universal joint.

Another object of the invention is to provide a vibration damper for the shaft which is associated with a brake on the latter.

Another object of the invention is to provide a vibration damper of the above designated character which comprises a part of the brake on the shaft.

For an understanding of the invention reference may be had to the accompanying drawing forming a part of this specification, in which:

Figure 1:
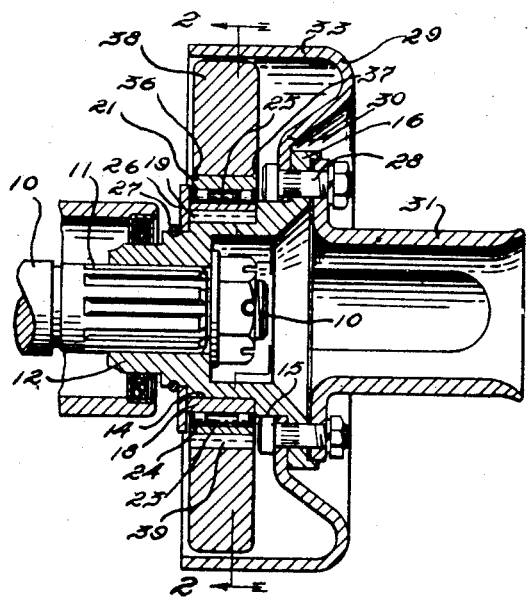
Fig. 1 is a fragmentary, longitudinal, sectional view of a transmission shaft, in which one form of the invention is incorporated.
Figure 2:
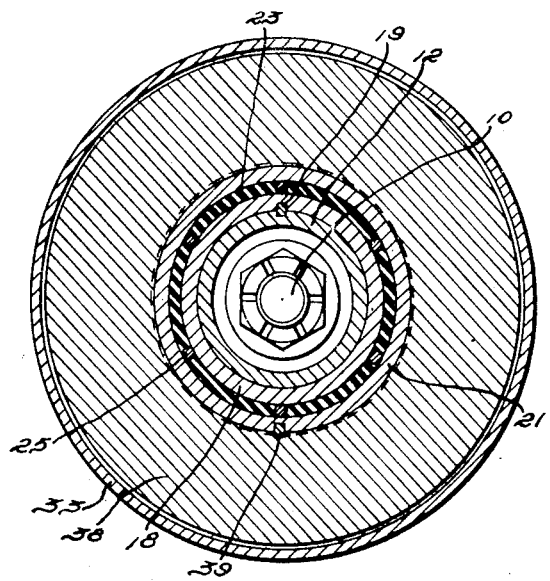
Fig. 2 is a sectional view taken substantially along the line 2—2 of Fig. 1.

Referring to Fig. 1, a driving shaft 10 is provided which is splined, as indicated at 11, to a hub member 12 having a cylindrical bearing surface 14. Adjacent the surface 14, an annular shoulder 15 of greater radius is provided which terminates in an annular radial flange 16. A cylindrical sleeve 18 composed of suitable material such as steel, snugly fits over the bearing surface 14, and is keyed to the hub member 12 as indicated at 19. A second sleeve 21 of similar material is arranged around the periphery of the sleeve 18, but is of such internal diameter that a substantial space exists between the sleeves. Resilient rubber 23 is arranged in the space between the sleeves and is cemented or bonded by vulcanization to both sleeves.

At circumferentially spaced intervals, rollers 25 of steel or other hard material are mounted in the space between the sleeves, and accordingly project axially through the rubber 23.

The rollers 25, as best shown by Fig. 1, have enlarged cylindrical end portions 24, which substantially contact with the adjacent peripheries of the sleeves 18 and 21 to provide a bearing contact, which intermediate portions of the rollers are of reduced diameter to provide a space around each roller for the rubber. This not only enables manufacturing the rubber member in the form of an annular ring, but enables associating the rollers and the rubber in a unitary construction.

The sleeve 18 is retained axially positioned on the bearing surface 14, by an annular plate 26 substantially contacting with the sleeve at one end and which is maintained in position on the hub member 12 by a split round wire 27 disposed in a groove in the latter. The other end of the sleeve is maintained in axial position by the shoulder 15 on the hub member 12.

Bolts 28 are utilized for securing a brake drum 29, having a radial portion 30, to the flange 16 on the hub member 12, with the radial portion 30 seating upon the shoulder 15 and disposed between the radial flange 16 on the hub member and the sleeve 21. Heads on the bolts 28 are located between the radial flange 30 on the brake drum, and the end of the sleeve 21. Also the bolts 28 secure a part of a universal joint connection 31 to the flange 16. The brake drum 29 is provided with an outer axially extending portion 33 which provides a braking surface for a contracting brake band (not shown).

The outer surface of the sleeve 21 is provided with annularly extending tapered ribs 36 and 37, which are utilized for the purpose of retaining an inertia member 38 axially positioned upon the outer surface of the sleeve. The inertia member 38 is keyed to the sleeve 21 for rotation therewith as indicated at 39 and fits within the brake drum 29 but its outer surface is substantially spaced from the inner periphery of the axially extending portion 33 of the latter.

The rubber ring 23, being bonded to both of the sleeves 18 and 21, constitutes a yielding connection between the inertia member 38 and the hub member 12, which effectively eliminates vibration. In operation, the inertia member tends to rotate at a constant speed and when the shaft begins to rotate at a greater speed, the inertia member through the yielding connection retards the increase, while if the shaft speed decreases, the inertia member also retards the decrease in speed.

Figure 3:
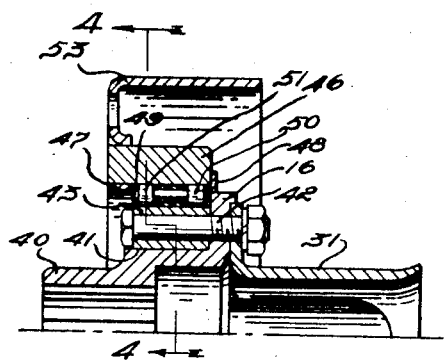
Fig. 3 is a sectional view similar to that shown by Fig. 1, illustrating another form of the invention.
Figure 4:
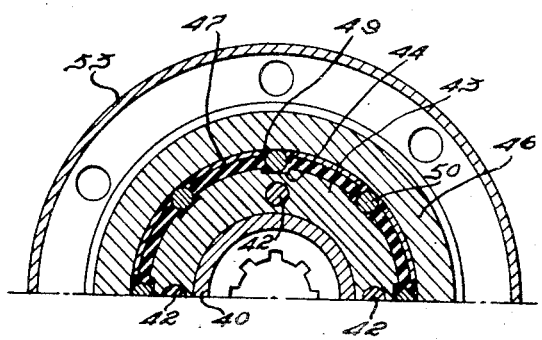
Fig. 4 is a sectional view taken substantially along the line 4—4 of Fig. 3.

According to Fig. 3, a hub member 40 is provided, somewhat different in construction from the hub member shown in Fig. 1, which similarly has a cylindrical bearing surface 41 and a radial flange 16 to which the universal joint connection member 31 is secured, by bolts 42 extending through the flange. A cylindrical member 43 is supported on the bearing surface 41 and is secured in an axial position against the flange 16 on the hub member 40, by the bolts 42. As best shown by Fig. 4, the outer periphery of the member 43 is provided with circumferentially spaced, axially extending slots 44 which are of substantially channel shape. An annular inertia member 46 fits over the bearing member 43 but in radially spaced relation with respect thereto, thereby providing an annular space between these members.

A circumferentially extending band 47 snugly fits the inner periphery of the inertia member 46, and is provided with a radial flange 48 at one end which engages one end surface of the latter. This band may be welded to the inertia member preferably by welding the flange 48 thereto, and is provided with circumferentially spaced slots 49 which correspond in shape to the seats 44 in the bearing member 43 and are aligned radially with respect thereto. Rollers 50 similar to the rollers 25 shown in Fig. 1, are disposed between the bearing member 43 and the inertia member 46, and in the relatively large apertures between these members provided by the radially aligned slots 44 and 49. These rollers are provided with enlarged cylindrical end portions 51 which substantially contact with the base portions of the slots 44 and 49 and therefore provide a metallic bearing contact between the members. The remainder of the space between the bearing member 43 and the inertia member 46 is filled with rubber preferably bonded to both members, which provides a yielding connection between the members and accordingly, rotation of one of the members yieldingly effects rotation of the other. Ordinarily the relative rotation of the members is limited by the yielding of the rubber, but should this relative rotation be greater than a predetermined amount, the enlarged portions 51 of the roller 50 will engage diagonally opposed corners of the slots 44 and 49 and consequently, positively limit their relative rotation.

In contrast to the construction shown by Fig. 1, a brake drum 53 is provided in the construction shown by Figs. 3 and 4, which is mounted on the outer periphery of the inertia member 46, whereas in the construction shown by Fig. 1, the brake drum is secured directly to the hub member 12. Accordingly in the construction shown by Figs. 3 and 4, the brake drum as well as the inertia member are yieldingly connected to the hub member.

Figure 5:
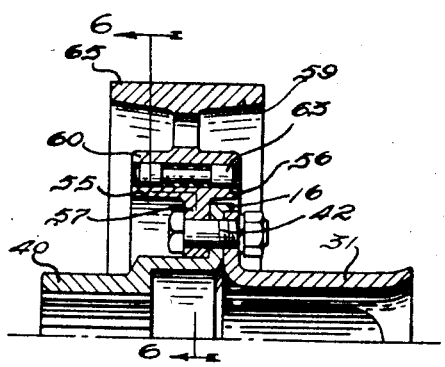
Fig. 5 is a sectional view similar to that shown by Fig. 3 in which another form of the invention is incorporated.
Figure 6:
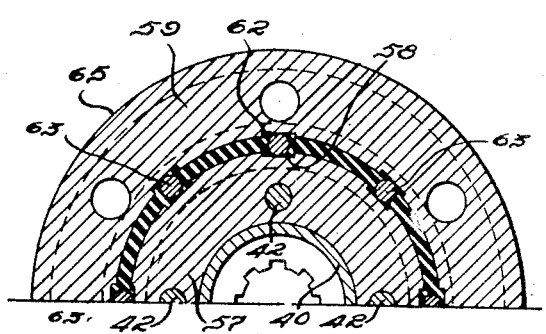
Fig. 6 is a sectional view taken substantially along the line 6—6 of Fig. 5.

In the construction shown by Figs. 5 and 6, the hub member is substantially identical to the hub member shown by Fig. 3 and is indicated by the numeral 40. An annular bearing member 55, having a bearing surface 56, is secured to the radial flange 16 on the hub member by means of the bolts 42 projecting through a radial web 57 on the inner periphery of the bearing member and the flange. As best shown by Fig. 6, the outer periphery of the bearing member 55 is provided with circumferentially spaced channel slots 58 substantially identical to the slots 44 provided in the construction shown by Fig. 3. An inertia member 59 is provided with an inner portion 60 which fits over the outer periphery of the bearing member 55, but in radially spaced relation thereto, and the inner periphery of the portion 60 is provided with axially arranged slots 62 also of channel shape, which are radially aligned with the slots 58 in the bearing member. Rollers 63 substantially identical to the rollers 50 shown in the construction in Fig. 3, are disposed in the space between the bearing member 55 and the portion 60 of the inertia member 59, and in the slots 58 and 62 and the enlarged end of the rollers similarly provide a metallic contact between the members. When relative, predetermined rotary movement of the members occurs, the enlarged end of the rollers engage diagonally opposed corners of the slots and therefore limit such movement. The space between the bearing member 55 and the portion 60 of the inertia member 59 is filled with rubber, which preferably is bonded to both members by vulcanization. Accordingly in this construction, as in the construction shown by Fig. 3, a yielding connection is provided between the hub member 40 and the inertia member 59, wherein relative rotary movement of the members, although ordinarily limited by the yielding connection, is positively limited by the rollers when such movement reaches a predetermined amount. Instead of providing a separate brake drum in this construction and securing it to the inertia member 59 as provided in the construction shown by Fig. 3, the outer peripheral surface 65 of the inertia member constitutes a braking surface.

It is apparent from the description previously given that an efficient vibration damper has been provided for neutralizing the effects of vibration occurring in the transmission shaft of the motor vehicle. It is apparent that this damper includes a yielding connection between relative rotary parts and rollers between the parts which constitute bearings between them for positively preventing radial movement of one part with respect to the other, and for positively preventing relative rotary movement of the parts beyond a predetermined amount. It is apparent that the vibration damper particularly is employed on the transmission shaft in the region of the universal joint connection and a brake drum on the shaft, and that in some instances the brake drum may be secured to the shaft directly whereas in other instances, the brake drum may be secured to the inertia member having the yielding connection to the shaft. Also it will be noted that in one instance, the brake drum and the inertia member comprise an integral construction.

Although only certain forms of the invention have been illustrated and described in detail, it will be apparent to those skilled in the art that the invention may be modified in various ways without departing from the scope of the appended claims.

I claim:

1. A vibration damper comprising a driven hub member, a brake drum mounted on said hub, said drum having an axially directed portion in spaced concentric relation to the hub, an inertia member mounted within the drum in spaced relation to its axially directed portion and yielding means connecting and disposed between axially directed portions of the hub and inertia member for permitting relative rotational movement therebetween.

2. A vibration damper comprising a driven hub member, a brake drum mounted on said hub, said drum having an axially directed portion in spaced concentric relation to the hub, an inertia member mounted within the drum in spaced relation to its axially directed portion and yielding means connecting and disposed between axially directed portions of the hub and inertia member for permitting relative rotational movement therebetween, said means comprising rubber located between and connected to the members.

3. A vibration damper comprising a driven hub member, an inertia member mounted in concentric relation to the hub member, said members having radially spaced concentric surfaces, rollers disposed between the surfaces and yielding means between and connected to the same surfaces.

4. A vibration damper comprising a driven hub member, a brake drum mounted on said hub, said drum having an axially directed portion in spaced concentric relation to the hub, an inertia member mounted within the drum in spaced relation to its axially directed portion and yielding means connecting and disposed between axially directed portions of the hub and inertia member for permitting relative rotational movement therebetween, said means comprising rubber located between and connected to the members, said rubber being vulcanized to said surfaces.

5. A vibration damper comprising a driven hub member, an inertia member mounted in concentric relation to the hub member, said members having radially spaced concentric surfaces, metal bearing elements disposed between the surfaces and having axially spaced enlarged portions contacting with and supporting one member on the other, and yielding means between and connected to both surfaces.

6. A vibration damper comprising a driven hub member, an inertia member mounted in concentric relation to the hub member, said member having radially spaced concentric surfaces, said surfaces having axially extending grooves in substantially radial alignment, and rubber disposed between the surfaces and in the grooves, the rubber being vulcanized to both surfaces, and relatively hard members disposed in the grooves, said members being of substantially the same thickness as the radial distance between the bases of the grooves.

7. A vibration damper comprising a driven hub member, an inertia member mounted in concentric relation to the hub member, said member having radially spaced concentric surfaces, said surfaces having axially extending grooves in substantially radial alignment, and rubber disposed between the surfaces and in the grooves, the rubber being vulcanized to both surfaces, and rollers disposed in the grooves, said rollers substantially contacting with the bases of the grooves.

8. A vibration damper comprising a driven hub member, an inertia member mounted in concentric relation to the hub member, said member having radially spaced concentric surfaces, said surfaces having axially extending grooves in substantially radial alignment, and rubber disposed between the surfaces and in the grooves, the rubber being vulcanized to both surfaces, and rollers disposed in the grooves, said rollers substantially contacting with the bases of the grooves, and having reduced portions for permitting the passage of rubber from one side to the other thereof.

9. A vibration damper comprising a driven hub member, a brake drum mounted on said hub, said drum having an axially directed portion in spaced concentric relation to the hub, an inertia member mounted within the drum in spaced relation to its axially directed portion and yielding means connecting the hub and inertia member for permitting relative rotational movement therebetween, said means comprising rubber located between and connected to the members, and rollers located between the members for providing a bearing contact and retaining the members in true concentric relation.

10. A vibration damping device comprising a driven hub member, yielding means mounted axially on said hub member, and an inertia member mounted on said yielding means and connected thereby to said hub member in yieldable driving relation, and a brake drum having an axially directed portion disposed at the outer edge of the inertia member, said brake drum being directly connected to the hub for rotating therewith.

11. A vibration damping device comprising a driven hub member, yielding means mounted axially on said hub member, and inertia member mounted on said yielding means and connected thereby to said hub member in yieldable driving relation, and a brake drum having an axially directed portion disposed at the outer edge of the inertia member, said brake drum being directly connected to the hub for rotating therewith, said yielding means comprising annularly extending rubber disposed between the inertia member and the hub and being bonded thereto.

12. A vibration damping device comprising a driven hub member, yielding means mounted on said hub member, and inertia member mounted on said yielding means and connected thereby to said hub member in yieldable driving relation, said yielding means comprising an annularly extending rubber ring, and rollers embedded in said ring, extending between the members and contacting with their adjacent surfaces.

13. A vibration damping device comprising a driven hub member, yielding means mounted on said hub member, an inertia member mounted on said yielding means and connected thereby to said hub member in yieldable driving relation, said yielding means comprising an annularly extending rubber ring, and rollers embedded in said ring, extending between the members and contacting with their adjacent surfaces, said rollers being located in axially extending grooves provided in both surfaces.

14. A vibration damper comprising a driven member, an inertia member mounted in concentric relation to said driven member, a plurality of rolling elements interposed between said members for journaling the inertia member on the driven member, and yielding means disposed circumferentially between the rollers and connecting said members for permitting relative movement therebetween.

15. A vibration damper comprising a driven member, an inertia member mounted in concentric relation to said driven member, a plurality of rolling elements interposed between said members for journaling the inertia member on the driven member, yielding means connecting said members for permitting relative movement therebetween, and means for definitely limiting such relative movement.

16. A vibration damper comprising a driven hub member, an inertia member in spaced concentric relation thereto, a plurality of spaced rollers in the space between said members for journaling the inertia member on the hub member and yielding means in the space between the rollers and connecting the members for permitting relative rotational movement thereof.

17. A vibration damper comprising a driven hub member, an inertia member in spaced concentric relation thereto, a plurality of spaced rollers in the space between said members for journaling the inertia member on the hub member, yielding means in the space between the rollers and connecting the members for permitting relative rotational movement thereof, and a brake drum mounted on said inertia member.

18. A vibration damper comprising a driven hub member, a brake drum mounted on the hub member for rotation therewith and having an axially directed portion spaced from the hub member, yielding means mounted on and extending around the hub member, at one side of the brake drum, an inertia member mounted on the yielding means, within the brake drum and being connected thereto by said yielding means, and bearing means between the inertia member and the hub member for maintaining the inertia member concentric to the hub member during their movement.

ARCHIBALD A. WARNER.